US007741238B2

(12) United States Patent
Sasame et al.

(10) Patent No.: US 7,741,238 B2
(45) Date of Patent: Jun. 22, 2010

(54) SPINEL SINTERED BODY, LIGHT TRANSMITTING WINDOW AND LIGHT TRANSMITTING LENS

(75) Inventors: Akira Sasame, Itami (JP); Ken-Ichiro Shibata, Osaka (JP); Akihito Fujii, Osaka (JP); Shigeru Nakayama, Osaka (JP)

(73) Assignee: Sumitomo Electric Industries, Ltd., Osaka-Shi (JP)

( * ) Notice: Subject to any disclaimer, the term of this patent is extended or adjusted under 35 U.S.C. 154(b) by 151 days.

(21) Appl. No.: 11/910,229

(22) PCT Filed: Mar. 28, 2006

(86) PCT No.: PCT/JP2006/306296

§ 371 (c)(1),
(2), (4) Date: Sep. 28, 2007

(87) PCT Pub. No.: WO2006/106670

PCT Pub. Date: Oct. 12, 2006

(65) Prior Publication Data

US 2009/0067077 A1    Mar. 12, 2009

(30) Foreign Application Priority Data

Mar. 30, 2005   (JP) .............................. 2005-097526

(51) Int. Cl.
    *C04B 35/443* (2006.01)
(52) U.S. Cl. ................................... 501/120
(58) Field of Classification Search .................. 501/120
    See application file for complete search history.

(56) References Cited

U.S. PATENT DOCUMENTS

| 4,543,346 | A | * | 9/1985 | Matsui et al. | ................ | 501/120 |
| 4,584,151 | A | * | 4/1986 | Matsui et al. | ............... | 264/1.21 |
| 7,247,589 | B2 | * | 7/2007 | Krell et al. | ................... | 501/120 |
| 2004/0266605 | A1 | * | 12/2004 | Villalobos et al. | ........... | 501/108 |

FOREIGN PATENT DOCUMENTS

| JP | 55027837 | 2/1980 |
| JP | 59-121158 | 7/1984 |
| JP | 62-72556 | 4/1987 |
| JP | 64-073316 | 3/1989 |
| JP | 01-286956 | 11/1989 |
| JP | 02-048462 | 2/1990 |
| JP | 04016552 | * 1/1992 |
| JP | 08-286146 | 11/1996 |
| JP | 11337914 | 12/1999 |
| JP | 2001-281053 | 10/2001 |
| JP | 2002-090873 | 3/2002 |
| JP | 2002-353355 | 12/2002 |
| JP | 2003-075912 | 3/2003 |
| JP | 2003-131164 | 5/2003 |
| JP | 2004-079963 | 3/2004 |
| JP | 2005-070734 | 3/2005 |
| JP | 2005-208079 | 8/2005 |
| JP | 2005-208165 | 8/2005 |

OTHER PUBLICATIONS

Huang et al "Preparation and properties of non-stoichiometric MgO. nAl2O3 transparent ceramics"., Cinese Journal of Material Research, Feb. 2006.*
Patent Abstracts of Japan, Publication No. 11-337914, Published Dec. 10, 1999 (1 page).
International Search Report issued in PCT Application No. 2006/306296 dated May 30, 2006 (2 pages).
Patent Abstracts of Japan for Publication No. 2001-281053 dated Oct. 10, 2001 (1 page).
Patent Abstract for JP Patent No. 55027837 dated Feb. 28, 1980 (1 page).
Patent Translation for Japanese Patent Application Publication No. 59-121158 dated Jul. 13, 1984 (2 pages).
Translation for Japanese Patent Application Publication No. 62-72556 dated Apr. 3, 1987 (2 pages).
Patent Abstracts of Japan for Publication No. 64-073316 dated Mar. 17, 1989 (1 page).
Patent Abstracts of Japan for Publication No. 2002-090873 dated Mar. 27, 2002 (1 page).
Patent Abstracts of Japan for Publication No. 2003-075912 dated Mar. 12, 2003 (1 page).
Patent Abstracts of Japan for Publication No. 2002-353355 dated Dec. 6, 2002 (1 page).
Patent Abstracts of Japan for Publication No. 2003-131164 dated May 8, 2003 (1 page).
Patent Abstracts of Japan for Publication No. 2004-079963 dated Mar. 11, 2004 (1 page).
Patent Abstracts of Japan for Publication No. 2005-070734 dated Mar. 17, 2005 (1 page).
Patent Abstracts of Japan for Publication No. 01-286956 dated Nov. 17, 1989 (1 page).
Patent Abstracts of Japan for Publication No. 02-048462 dated Feb. 19, 1990 (1 page).
Patent Abstracts of Japan for Publication No. 08-286146 dated Nov. 1, 1996 (1 page).
Patent Abstracts of Japan for Publication No. 2005-208079 dated Aug. 4, 2005 (1 page).
Patent Abstracts of Japan for Publication No. 2005-208165 dated Aug. 4, 2005 (1 page).
Newsletter "Sei News", vol. 296 published May 2002 and its partial English translation (10 pages).

* cited by examiner

*Primary Examiner*—Karl E Group
(74) *Attorney, Agent, or Firm*—Osha• Liang LLP

(57) ABSTRACT

A low-cost spinel sintered body having small polarization and high heat-conductivity is provided. Also, a useful light-transmitting window and light-transmitting lens for light-emitting device is provided. For such purpose, the spinel sintered body of the present invention has a contrast ratio of 300 or more in the case of white light, where the contrast ratio is defined as the quotient obtained by dividing an amount of transmitting light in the case of being arranged between two polarizing plates, the polarizing directions of the two polarizing plates being parallel to each other, by an amount of transmitting light in the case of being arranged between two polarizing plates, the polarizing directions of the two polarizing plates being orthogonal to each other.

7 Claims, No Drawings

SPINEL SINTERED BODY, LIGHT TRANSMITTING WINDOW AND LIGHT TRANSMITTING LENS

TECHNICAL FIELD

The present invention relates to spinel sintered bodies having superior properties in terms of in-line transmittance, polarization property, and heat sink capacity, which are capable of complying with a future need of electronic devices. The invention also relates to a light-transmitting window and a light-transmitting lens, in which such spinel sintered bodies are used, for a light-emitting device.

BACKGROUND ART

In response to rapid development of electronic devices, peripheral parts used in electronic devices must have advanced properties. For example, with respect to a light-transmitting lens and light-transmitting window for an electronic device, what is required is not only high in-line transmittance but also a material having superior polarization property in order to transmit high density optical signals. Also, it is important to use a material having high heat-sink capacity since the functional stability of an electronic device is affected by subtle generation of heat.

In the past, sapphire has been well known as an optical material having excellent heat sink capacity. Sapphire consists of alumina single crystal, and has high strength as well as very high heat conductivity of 42 W/(m·K). However, sapphire is expensive and has hexagonal crystal structure, exhibiting optical anisotropy. Therefore, if sapphire is used for a transmitting window of a polarized light optical instrument, it takes much time and labor for packaging, resulting in high manufacturing cost, since the axial adjustment of the crystallographic axis of sapphire is necessary with respect to the direction of incident polarized light.

Quartz glass is known as a material having superior polarization property and in-line transmittance. However, the thermal conductivity of quartz glass is as small as 0.01 W/(m·K) to 0.9 W/(m·K) and the heat sink capacity of quartz glass is not sufficient. A material having excellent polarization property is a spinel sintered body. Since the spinel sintered body consists of $Al_2O_3$ and MgO and its crystal type is cubic crystal, it ideally does not exhibit birefringence and is superior in terms of polarization properties.

Of the spinel sintered body, it is introduced that the materials in which the composition ratio of $Al_2O_3$ and MgO is 0.53:0.47 to 0.58:0.42 have superior in-line transmittance (Refer to Japanese Patent Application Laid-Open No. S 59-121158 (Patent document 1)). It is disclosed that this composition ratio can be obtained when a material powder in which n is in the range of 1.127 to 1.381 in the expression of $Al_2O_3 \cdot nMgO$ is subjected to pressureless sintering, after forming, at 1700° C. to 1800° C. for 10 hours to 20 hours in a hydrogen atmosphere.

According to the teaching disclosed in the above-mentioned patent document, in order to obtain a spinel sintered body having a high transmissivity by sintering in the hydrogen atmosphere, it is better to allow 10% or more of the MgO contained in the material powder to evaporate rather than completely restraining the vaporization of MgO, which vaporizes at a temperature of 1400° C. or higher. In the above-mentioned patent document, it is also suggested that preferably the sintering should be performed in a hydrogen atmosphere because transmitting light is scattered and accordingly the transmissivity deteriorates in any cases where the sintering is performed in air or $N_2$ gas or in vacuum: if the sintering is performed in air or $N_2$ gas, $N_2$ will be introduced into a closed pore, which results in difficulty in the vanishment of the pore, whereas if the sintering is performed in vacuum, the vanishment of MgO becomes remarkable such that $Al_2O_3$ becomes overabundant.

[Patent document 1] Japanese Patent Application Laid-Open No. S59-121158

DISCLOSURE OF INVENTION

Problems to be Solved by the Invention

However, if 10% or more of MgO vaporizes from the material powder when the sintering is done in the hydrogen atmosphere, oxygen defects increase, and consequently the in-line transmittance, the polarization property, and the thermal conductivity will deteriorate. Also, the $Al_2O_3$ solid solution quantity increases, and the microscopic variations and the strain of the crystal lattice increase. Accordingly, the optical property and the thermal property will be degraded. Moreover, if the sintering is performed at a high temperature for hours, crystals in the sintering body grow to have a grain size of 100 μm or more.

A problem to be solved by the present invention is to provide a low-cost spinel sintered body having small polarization and high heat-conductivity. Another problem to be solved is to provide a useful light-transmitting window and light-transmitting lens for light-emitting device.

Means for Solving the Problem to be Solved

The feature of a spinel sintered body of the present invention is that the contrast ratio in the case of white light is equal to or more than 300, where the contrast ratio is defined as the quotient obtained by dividing an amount of transmitting light in the case of being arranged between two polarizing plates, the polarizing directions of which are parallel to each other, by an amount of transmitting light in the case of being arranged between two polarizing plates, the polarizing directions of which are orthogonal to each other. Preferably, the contrast ratio is equal to or more than 1000. The composition of this sintered body is $MgO \cdot nAl_2O_3$, where n is preferably 1.05 to 1.30, and more preferably 1.07 to 1.125. Also, with a thickness of 1 mm, this sintered body preferably exhibits an in-line transmittance of 70% or more with respect to a light ray having a wavelength of 500 nm, and an in-line transmittance of 60% or more with respect to a light ray having a wavelength of 350 nm. Moreover, the thermal conductivity of the sintered body is preferably equal to or more than 12 W/(m·K). Such a spinel sintered body is typically used in the light-transmitting window and the light-transmitting lens of the present invention, which are used for a light-emitting device. Likewise, such a spinel sintered body is used in the light-transmitting window of the present invention for a liquid crystal panel and a digital micro mirror device.

Advantageous Effect of the Invention

According to the present invention, a spinel sintered body having a high contrast ratio, in-line transmittance of light, and thermal conductivity can be provided.

BEST MODE FOR CARRYING OUT THE INVENTION (Spinel Sintered Body)

One of the features of a spinel sintered body according to the present invention is that the contrast ratio thereof is equal to or more than 300 with respect to white light. The ratio A:B is called a polarization extinction ratio and the value of A÷B is called a contrast ratio, where A is an amount of transmitting light in the case in which the spinel sintered body is arranged between two polarizing plates having mutually parallel polarizing directions, and B is an amount of transmitting light in the case in which the spinet sintered body is arranged between two polarizing plates having mutually orthogonal polarizing directions.

In the case where two polarizing plates made of an ideal optical crystal are arranged such that the polarizing directions thereof are parallel to each other, the light that has been transmitted through the upstream polarizing plate is transmitted 100% through the downstream polarizing plate. On the other hand, in the case where the two polarizing plates are arranged such that the polarizing directions thereof are perpendicular to each other, the light that has been transmitted through the upstream polarizing plate is transmitted 0% through the downstream polarizing plate because the polarizing direction is not affected by the ideal optical crystal. With a real crystal, however, the polarizing direction of transmitting light is affected, resulting in collapse of the polarizing direction, the amount of the transmitting light does not reach 100% in the case of the parallel arrangement, and the amount of the transmitting light in the case of the perpendicular arrangement is not 0%. Therefore, the polarization property of a crystal can be evaluated by the polarization extinction ratio or the contrast ratio.

The polarization properties can be measured by obtaining a contrast ratio, which is calculated by A÷B, wherein A is an amount of transmitting light measured by CCD in the case in which a sample piece is put between two polarizing plates arranged perpendicularly with respect to the optical axis such that the polarizing directions of the polarizing plates are parallel to each other, and likewise, B is an amount of transmitting light in the case in which the polarizing directions of the polarizing plates are perpendicular to each other.

As for the spinel sintered body, since the crystal structure is a cubic crystal, the polarization properties are excellent ideally with no optical anisotropy; however, in reality, the polarization properties are degraded because of oxygen defects in the crystal, variations and strain of the crystal lattice, etc. The spinel sintered body of the present invention has a contrast ratio of 300 or more, and preferably 1000 or more, in the case of the white light. Accordingly, it has good polarization properties like glass, and therefore, the packaging cost is low because such labor as adjusting the crystallographic axis to the polarizing direction is less needed for packaging. Also, the spinel sintered body of the present invention is superior to sapphire in terms of low cost and mass production.

The composition of the spinel sintered body is $MgO.nAl_2O_3$, where n is preferably 1.05 to 1.30, and more preferably 1.07 to 1.125. It is possible to improve the polarization properties by preventing exhalation of MgO, thereby adjusting n to be within the range of 1.05 to 1.30 so that the $Al_2O_3$ solid solution quantity may decrease, thereby lessening the variation and the strain of microscopic crystal lattices.

The spinel sintered body preferably has an in-line transmittance of 70% or more, and more preferably 80% or more, in the case of 1 mm thickness and a light ray (visible ray) having a wavelength of 500 nm. Also, the spinel sintered body preferably has an in-line transmittance of 60% or more, and more preferably 70% or more, in the case of 1 mm thickness and a light ray (ultraviolet light) having a wavelength of 350 nm. The in-line transmittance is the ratio of the intensity of transmitted light to the intensity of incident light on the straight line which is parallel to the optical axis of the incident light. Thus, the higher the in-line transmittance with respect to electromagnetic wave of each wavelength, the stronger the transmitted light, resulting in decrease of light energy absorbed by the lens or transmitting window through which the light is transmitted. Accordingly the heat generation of the lens or the transmitting window can be suppressed.

The spinel sintered body preferably has a thermal conductivity of 12 W/(m·K) or more, and more preferably 16 W/(m·K) or more. Such a spinel sintered body is superior in terms of heat dissipation, and therefore it is suitable for use as a heat-sink and optical window material in accordance with the demand for higher density packaging and higher output of electronic optical devices.

The spinel sintered body of the present invention, which has a high in-line transmittance and superior polarization property is capable of transmitting optical signals of high density. Also, this sintered body is superior in terms of heat dissipation, because its heat generation due to light from a light source is small and its thermal conductivity is high. Therefore, the sintered body is suitable as a material of a light-transmitting lens or light-transmitting window for a light-emitting device such as a light-emitting diode (LED), laser device, liquid crystal projector, rear projection television or digital micro mirror device, etc.

The digital micro mirror device is a reflection-type optical device developed by Texas Instruments, Inc., and is used for Digital Light Processing (DLP) technology, which is a light processing technology for a projector. The light-transmitting window of the reflection-type optical device must have high performance of heat dissipation and high light transmittance with little optical anisotropy.

(Method of Manufacturing a Spinel Sintered Body)

The composition of a spinel powder as a starting material is $MgO.nAl_2O_3$, where n is preferably 1.05 to 1.30, and more preferably 1.07 to 1.125. The purity is equal to or more than 99.7%, and the specific surface area (BET value) is preferably 12 $m^2/g$, and more preferably 20 $m^2/g$, in view of maintaining activation and ease of sintering. Also, the specific surface area is preferably 70 $m^2/g$ or less from the viewpoint of material powder bulk and ease of forming.

It is preferable not to add any organic binder and a sintering additive such as LiF or CaF to the spinel powder. This is because the purity of raw materials and the residues such as a binder in a forming process tend to significantly affect the purity of the product. Therefore, if an organic binder is to be added, the blending ratio is preferably 1% or less, and more preferably 0.5% or less. Also, the kind of the binder is preferably a binder that can readily exhibit thermal decomposition, such as acrylic type.

The forming density is preferably 2.0 $g/cm^3$ or more from the viewpoint of maintaining the bulk density and increasing the mutual contact area of the grains during sintering so as to obtain sufficient sintered density. On the other hand, from the viewpoint of removing impurities by easily discharging to the outside the gas generated during debinding and the gas adhering to the surface of the grains, the suitable forming density is 2.5 $g/cm^3$ or less.

The spinel sintered body of the present invention can be manufactured, for example, by pressureless sintering in an atmospheric air atmosphere and hot isostatic pressing (HIP). If the sintering is performed in the atmospheric air atmosphere, the exhalation of MgO can be prevented by the oxygen partial pressure such that the solid solution quantity of $Al_2O_3$ little varies, thereby reducing the microscopic variation and strain of the crystal lattice, which is different from the case where the sintering is performed in a hydrogen atmosphere. Also, the closed pores which contain $N_2$ gas can be removed by HIP. Accordingly, it is possible to produce a spinel sintered body having satisfactory in-line transmittance, polarization property; and thermal conductivity.

A spinel material of about 12 m$^2$/g to 40 m$^2$/g is formed by a press or the like, and after pressureless sintering is done at a temperature of 1450° C. to 1650° C. in an atmospheric air atmosphere, HIP is performed in an Ar atmosphere at a temperature of 1500° C. to 1700° C., under 2×10$^2$ MPa, whereby a product of 10 mm×10 mm×1 mm can be manufactured, for example. Also, a protective coating may be applied as needed. The preferable forming density is 2.1 g/cm$^3$ or more. Thus, in this method, it is possible to produce a sintered body which includes grains having an average grain size of 30 μm to 90 μm. The measurement of the grain size is done by photographing, with SEM of 1500 magnifications, five arbitrary points on a fracture surface of the sintered body and by calculating the arithmetic mean of 25 diameters, which consist of the largest outer diameter of five grains arbitrarily selected at each of the five points. In the following, the measurement of grain sizes is done in the same manner.

The spinel sintered body of the present invention can also be manufactured, for example, with pressure sintering in a vacuum atmosphere and HIP. The pressure forming in the vacuum atmosphere is done in a highly airtight carbon case, suppressing the exhalation of MgO, and it can decrease microscopic variations and strain of the crystal lattice by reducing variations in Al$_2$O$_3$ solid solution quantity. Also, the sintering density can be enhanced with HIP. Therefore, it is possible to manufacture a spinel sintered body in which oxygen defects little exist and which has satisfactory in-line transmittance, polarization property, and thermal conductivity.

A spinel material of about 12 m$^2$/g to 20 m$^2$/g is formed by a press or the like and is subjected to pressure forming in a vacuum atmosphere at 1350° C. to 1550° C., and after it is subjected to HIP at 1600° C. to 1700° C., under 2×10$^2$ MPa in an Ar atmosphere, the product processing is performed. If necessary, coating is also done. Thus, in this method, a sintered body which includes grains having an average grain size of 20 μm to 80 μm can be manufactured.

In both of the above-mentioned methods, if a coating made of a material having lower refractive index than the spinel sintered body is applied on the surface of the spinel sintered body, the light transmittance properties improve. If the coating is applied in a plurality of layers in combination of two or more kinds of layers made of materials selected out of metal fluorides and metal oxides, the adhesion between the coating and the spinel sintered body is enhanced and the environmental stability improves. Of the metal fluorides, preferably MgF$_2$, YF$_3$, LaF$_3$, CeF$_3$, BaF$_2$, etc can be used. As for the metal oxides, SiO$_2$, TiO$_2$, Al$_2$O$_3$, Y$_2$O$_3$, Ta$_2$O$_5$, ZrO$_2$, etc. can preferably be used. It is preferable to limit the thickness of the coating layer not to 5 μm at maximum even in the coating layer of multi-layer composition. The coating can be done using a physical vapor deposition method, such as sputtering, ion plating, vacuum deposition, etc. Particularly, if an ion assist and a plasma assist are used in combination, the film performance improves.

EXAMPLE 1

Spinel powders (composition: MgO.nAl$_2$O$_3$) (n=1.05 to 1.30) were press formed to have a density of 2.1 g/cm$^3$ to 2.15 g/cm$^3$ and sintered at 1525° C. for one hour in an atmospheric air atmosphere. The sintered products thus prepared were subjected to HIP at 1650° C., under 2×10$^2$ MPa for one hour in an Ar atmosphere and then polished to have a plate-shape body of 1 mm in thickness. no coating was applied for improving transmissivity. The samples thus prepared were measured with respect to the contrast ratio, in-line transmittance and thermal conductivity.

The contrast ratio was measured with a polarizing microscope (BX-1 from Olympus Corp.) by 100 magnifications with respect to a white light source. Arbitrary five points were measured for each of five sheets of samples prepared by polishing to have a thickness of 1 mm, and the measured values were averaged. The in-line transmittance was measured with a spectrophotometer, and the in-line transmittance at 1 mm thickness was measured with respect to incident light of 350 nm, 500 nm, 1000 nm, and 4500 nm wavelengths. Also, the thermal conductivity was measure by a laser flash method under the conditions in which carbon was coated on both sides through which a laser beam passes. The results of the measurement are shown in Table I

TABLE I

| Item | | Comparative Example 1 | | Example 1 | | | | | | | Comparative Example 1 | | |
|---|---|---|---|---|---|---|---|---|---|---|---|---|---|
| n | | 0.95 | 1 | 1.05 | 1.07 | 1.1 | 1.125 | 1.13 | 1.2 | 1.25 | 1.3 | 1.325 | 1.35 | 1.4 |
| Contrast Ratio | | 23 | 34 | 316 | 1131 | 1110 | 1013 | 390 | 356 | 348 | 311 | 80 | 65 | 21 |
| Thermal Conductivity (W/(mk)) | | 11 | 15 | 16 | 18 | 18.3 | 17.5 | 15.8 | 14 | 13 | 12 | 11 | 10 | 9.8 |
| In-line Transmittance (%) | 350 nm | 1 | 10 | 71 | 84 | 85 | 83 | 77 | 70 | 65 | 60 | 52 | 40 | 30 |
| | 500 nm | 5 | 50 | 85 | 85 | 86 | 83 | 81 | 78 | 75 | 72 | 65 | 54 | 40 |
| | 1000 nm | 20 | 75 | 85 | 86 | 86 | 84 | 82 | 80 | 77 | 75 | 70 | 66 | 55 |
| | 4500 nm | 75 | 82 | 85 | 85 | 85 | 85 | 84 | 84 | 83 | 81 | 80 | 77 | 75 |

COMPARATIVE EXAMPLE 1

Spinel sintered bodies were prepared in the same manner as in Example 1 except that spinel powders (composition: MgO.nAl$_2$O$_3$) (n=0.95 to 1.00, 1.325 to 1.40) were used as material powders, and their contrast ratio, in-line transmittance, and thermal conductivity were measured. The results of the measurement are shown in Table I.

As a result, the spinel sintered bodies having a contrast ratio of 300 or more exhibited satisfactory polarization properties, and n was in the range of 1.05 to 1.30. These spinel sintered bodies had an in-line transmittance of 70% or more with respect to a light ray of 500 nm wavelength, and an in-line transmittance of 60% or more with respect to a light ray of 350 nm wavelength. Also, the thermal conductivities were equal to or more than 12 W/(m·K).

Of these, as to the spinel sintered bodies having a contrast ratio of 1000 or more, n was in the range of 1.07 to 1.125, the in-line transmittance was 80% or more with respect to a light ray of 500 nm wavelength, and also the in-line transmittance with respect to a light ray of 350 nm wavelength was equal to or more than 80%.

The spinel sintered bodies whose contrast ratio is less than 300 exhibited unsatisfactory polarization properties from the viewpoint of practical use, and n was in the range of 0.95 to 1.00 and 1.325 to 1.40. The in-line transmittance of these spinel sintered bodies was less than 70% with respect to a light ray having a wavelength of 500 nm and was less than 60% with respect to a light ray having a wavelength of 350 nm. Also, the thermal conductivity was less than 12 W/(m·K) except for the case of n=1.

EXAMPLE 2

The plate-shaped spinel sintered bodies prepared in Example 1 were incorporated as a light-transmitting window into a liquid crystal panel and evaluated with respect to an image in the range of wavelength of 350 nm to 4500 nm.

COMPARATIVE EXAMPLE 2

The plate-shaped spinel sintered bodies prepared in Comparative Example 1 were incorporated as a light-transmitting window into a liquid crystal panel and were evaluated with respect to images in the range of wavelength of 350 nm to 4500 nm in the same manner as in Example 2.

As a result, in the cases where n=1.05 to 1.30, there were no recognizable nonuniformities of contrast in the images thus shown, that is, the results were satisfactory, nearly equivalent to quartz glass. Particularly, as for the spinel sintered bodies in the range of n=1.07 to 1.125, the image quality was extremely good, not inferior to that of quartz glass, or better than that of quartz glass.

EXAMPLE 3

With respect to the spinel sintered bodies of Example 1, an evaluation of packaging was performed in the same manner as in Example 2 after a coating made of a low refractive index material consisting of $MgF_2$ is applied with a thickness of 0.1 µm so as to restrain reflection and thereby improve the light transmittance.

COMPARATIVE EXAMPLE 3

With respect to the spinel sintered bodies of Comparative Example 1, an evaluation of packaging was performed in the same manner as in Example 2 after a coating made of a low refractive index material consisting of $MgF_2$ is applied with a thickness of 0.1 µm as in Example 3 so as to improve the light transmittance by restraining the reflection.

As a result, the spinel sintered bodies of n=1.05 to 1.30 exhibited extremely satisfactory images at a wavelength in the range of 350 nm to 4500 nm. However, outside of the range of n=1.05 to 1.30, nonuniformities of contrast were recognized, which were unacceptable results.

EXAMPLE 4

The spinel sintered bodies prepared in Example 1 were incorporated, as light-transmitting windows of a blue laser having output power of 120 mW, into can-type packages. Thus, the gain factor thereof was evaluated. The gain factor was aimed at 5% or more.

COMPARATIVE EXAMPLE 4

The spinel sintered bodies prepared in Comparative Example 1 were incorporated, as light-transmitting windows of a blue laser having output power of 120 mW, into can-type packages as in Example 4, the gain factor thereof was evaluated.

As a result, a correlation between the gain factor and the thermal conductivity of the spinel sintered body was recognized. When the thermal conductivity fell below 12 W/(m·K), the gain factor became 4.2% or less because of the heat generation of the laser device itself, resulting in a short life of the laser device, and it was impossible to put into practical use. When the thermal conductivity of the spinel sintered bodies was in the range of 12 W/(m·K) to 15 W/(m·K), the gain factor reached 5.3% to 5.5%, which was a level capable of practical use. Also, in the case of 15 W/(m·K) or more, the gain factor became 5.8% or more, and furthermore the heat radiation properties improved, resulting in improved reliability.

EXAMPLE 5

The spinel sintered bodies prepared in Example 1 were incorporated, as light-transmitting lenses for condensers of purple light in LED having an output power of 35 mW, into can-type packages, and the gain factor was evaluated. The gain factor was aimed at 15% or more.

COMPARATIVE EXAMPLE 5

The spinel sintered bodies prepared in Comparative Example 1 were incorporated, as light-transmitting lenses for condensers of purple light in LED having an output power of 35 mW, into can-type packages as in Example 5, and the gain factor was evaluated.

As a result, a correlation between the gain factor and the thermal conductivity of the spinel sintered body was recognized. When the thermal conductivity fell below 12 W/(m·K), the gain factor became 10% or less because of the heat generation of the LED device, and the lifetime of the LED device was short. Thus, it was impossible to put into a practical use. When the thermal conductivity of the spinet sintered bodies was in the range of 12 W/(m·K) to 15 W/(m·K), the gain factor reached 15.8% to 16.4%, which was a level capable of practical use. Also, when the thermal conductivity was 15 W/(m·K) or more, the gain factor became 17.3% or more, and furthermore the heat radiation properties improved.

EXAMPLE 6

Spinel powders (composition: $MgO.nAl_2O_3$) (n=1.05 to 1.30) were subjected to performing, and the preforms thus prepared were put into a container made from graphite and were subjected to pressure sintering at 1500° C., under 34 MPa in vacuum. The spinel sintered bodies thus prepared were processed into polycrystals using HIP at 1665° C., under $2 \times 10^2$ MPa in an Ar atmosphere. Thereafter, they were processed by polishing into plate-shaped bodies having a thickness of 1 mm, and their contrast ratio, in-line transmittance, and thermal conductivity were measured. The in-line transmittance was measured by incident light having a wavelength of 350 nm, 500 nm, 1000 nm, and 4500 nm. The results are shown in Table II.

TABLE II

| Item | | Comparative Example 6 | | | Example 6 | | | | | | | Comparative Example 6 | | |
|---|---|---|---|---|---|---|---|---|---|---|---|---|---|---|
| n | | 0.95 | 1 | 1.05 | 1.07 | 1.1 | 1.125 | 1.13 | 1.2 | 1.25 | 1.3 | 1.325 | 1.35 | 1.4 |
| Contrast Ratio | | 31 | 52 | 347 | 1230 | 1111 | 1018 | 432 | 411 | 382 | 356 | 90 | 76 | 29 |
| Thermal Conductivity (W/(mk)) | | 13.5 | 15 | 16.1 | 17.9 | 18.2 | 17.6 | 15.9 | 14.2 | 13.5 | 12.4 | 10.8 | 10.5 | 9.5 |
| In-line Transmittance (%) | 350 nm | 2 | 14 | 73 | 84 | 85 | 84 | 75 | 71 | 64 | 60 | 53 | 38 | 25 |
| | 500 nm | 15 | 55 | 85 | 85 | 86 | 84 | 80 | 79 | 72 | 72 | 66 | 55 | 42 |
| | 1000 nm | 45 | 77 | 85 | 86 | 86 | 85 | 81 | 80 | 75 | 75 | 71 | 67 | 57 |
| | 4500 nm | 78 | 83 | 85 | 85 | 85 | 85 | 84 | 84 | 81 | 81 | 81 | 77 | 75 |

COMPARATIVE EXAMPLE 6

Spinel sintered bodies were prepared in the same manner as in Example 6 except that spinel powders (composition $MgO \cdot nAl_2O_3$) (n=0.95 to 1.00, 1.325 to 1.40) were used as material powders, and their contrast ratio, in-line transmittance, and thermal conductivity were measured. The results of the measurement are shown in Table II.

As a result, the spinel sintered bodies having a contrast ratio of 300 or more exhibited satisfactory polarization properties, and n was in the range of 1.05 to 1.30. These spinel sintered bodies had an in-line transmittance of 70% or more with respect to light ray having a wavelength of 500 nm, and an in-line transmittance of 60% or more with respect to light ray having a wavelength of 350 nm. Also, the thermal conductivity thereof was equal to or more than 12 W/(m·K).

Of these, the spinel sintered bodies having contrast ratio of 1000 or more were those in which n was in the range of 1.07 to 1.125, and they exhibited an in-line transmittance of 80% or more with respect to light ray of 500 nm wavelength, and the in-line transmittance of 70% or more with respect to light ray of 350 nm wavelength. Also, their thermal conductivity was equal to or more than 17 W/(m·K).

The spinel sintered bodies whose contrast ratio was less than 300 were unsatisfactory in terms of the polarization property from the viewpoint of practical use, and n was in the range of 0.95 to 1.00 and 1.325 to 1.40. The in-line transmittance of these spinel sintered bodies was less than 70% with respect to light ray of 500 nm wavelength, and less than 60% with respect to light ray of 350 nm wavelength. Also, their thermal conductivity was less than 12 W/(m·K) except for the case of n=1.

EXAMPLE 7

The plate-shaped spinel sintered bodies prepared in Example 6 were incorporated as light-transmitting windows into a liquid crystal panel, and images were evaluated in the wavelength range of 350 nm to 4500 nm.

COMPARATIVE EXAMPLE 7

The plate-shaped spinel sintered bodies prepared in Comparative Example 6 were incorporated as light-transmitting windows into a liquid crystal panel, and images were evaluated in the wavelength range of 350 nm to 4500 nm in the same manner as in Example 7.

As a result, in the range of n=1.05 to 1.30, the images thus shown exhibited no recognizable nonuniformities of contrast and were considered as satisfactory, being substantially equivalent to those of quartz glass. Particularly, the spinel sintered bodies in which n is in the range of 1.07 to 1.125 exhibited images which were not inferior to, or rather better than, those of quartz glass.

EXAMPLE 8

With respect to the spinel sintered bodies of Example 6, an evaluation of packaging was performed in the same manner as in Example 7 after a coating made of a low refractive index material consisting of $MgF_2$ is applied with a thickness of 0.1 μm so as to restrain reflection and thereby improve the light transmittance.

COMPARATIVE EXAMPLE 8

With respect to the spinel sintered bodies of Comparative Example 6, an evaluation of packaging was performed in the same manner as in Example 7 after a coating made of a low refractive index material consisting of $MgF_2$ is applied with a thickness of 0.1 μm as in Example 8.

As a result, in the cases of spinel sintered bodies in which n was 1.05 to 1.30, the images shown in the range of wavelength 350 nm to 1000 nm were extremely good. However, outside the range in which n was 1.05 to 1.30, irregularities of contrast were recognized, and accordingly the spinel sintered bodies were judged as unacceptable.

EXAMPLE 9

The spinel sintered bodies prepared in Example 6 were incorporated, as light-transmitting windows of a blue laser having output power of 130 mW, into can-type packages. Thus, the gain factor thereof was evaluated. The gain factor was aimed at 5% or more.

COMPARATIVE EXAMPLE 9

The spinel sintered bodies prepared in Comparative Example 6 were incorporated, as light-transmitting windows of a blue laser having output power of 130 mW, into can-type packages. Thus, the gain factor thereof was evaluated.

As a result, a correlation between the gain factor and the thermal conductivity of the spinel sintered body was recognized. When the thermal conductivity fell below 12 W/(m·K), the gain factor became 4.3% or less because of the heat generation of the laser device itself, resulting in a short life of the laser device, and it was impossible to put into practical use. When the thermal conductivity of the spinel sintered bodies was in the range of 12 W/(m·K) to 15 W/(m·K), the gain factor reached 5.5% to 5.7%, which was a level capable of practical use. Also, in the case of 15 W/(m·K) or more, the gain factor became 6.0% or more, and furthermore the heat radiation properties improved, resulting in improved reliability.

EXAMPLE 10

The spinel sintered bodies prepared in Example 6 were incorporated, as light-transmitting lenses for condensers of purple light in LED having an output power of 35 mW, into can-type packages, and the gain factor was evaluated. The gain factor was aimed at 15% or more.

COMPARATIVE EXAMPLE 10

The spinel sintered bodies prepared in Comparative Example 6 were incorporated, as light-transmitting lenses for condensers of purple light in LED having an output power of 35 mW, into can-type packages, and the gain factor was evaluated.

As a result, a correlation between the gain factor and the thermal conductivity of the spinel sintered body was recognized. When the thermal conductivity fell below 12 W/(m·K), the gain factor became 10% or less because of the heat generation of the LED device, and the lifetime of the LED device was short. Thus, it was impossible to put into a practical use. When the thermal conductivity of the spinel sintered bodies was in the range of 12 W/(m·K) to 15 W/(m·K), the gain factor reached 15.8% to 16.4%, which was a level capable of practical use. Also, when the thermal conductivity was 15 W/(m·K) or more, the gain factor became 17.3% or more, and furthermore the heat radiation properties improved.

It should be understood that the embodiments and Examples disclosed herein are exemplary and not restrictive in all respects. The scope of the present invention is intended to be shown, not by the above description, but by the scope of a claim, including all modifications and equivalents thereof.

INDUSTRIAL APPLICABILITY

The present invention can provide a light-transmitting window and a light-transmitting lenses for a light-emitting device, such as a light-emitting diode, a laser device, or a liquid crystal projector. The light-transmitting window and the light-transmitting lens, which have high in-line transmittance and superior polarization properties, can transmit high density optical signals and are superior in terms of heat sink capacity.

The invention claimed is:

1. A spinel sintered body having a contrast ratio of 300 or more in the case of white light, where the contrast ratio is defined as the quotient obtained by dividing an amount of transmitting light in the case of being arranged between two polarizing plates, the polarizing directions of the two polarizing plates being parallel to each other, by an amount of transmitting light in the case of being arranged between two polarizing plates, the polarizing directions of the two polarizing plates being orthogonal to each other, wherein the spinel sintered body has a composition of $MgO.nAl_2O_3$, where n is 1.07 to 1.125, where with a thickness of 1 mm the spinel body exhibits an in-line transmittance of 78% or more with respect to a light ray having a wavelength of 500 nm, and where with a thickness of 1 mm the spinel body exhibits an in-line transmittance of 70% or more with respect to a light ray having a wavelength of 350 nm.

2. A spinel sintered body according to claim 1, where the contrast ratio is 1000 or more.

3. A spinel sintered body according to claim 1, where the thermal conductivity of the sintered body is equal to or more than 12 W/(m·K).

4. A light-transmitting window for a light-emitting device, where the light-transmitting window uses the spinel sintered body according to claim 1.

5. A light-transmitting window for a liquid crystal panel, where the light-transmitting window uses the spinel sintered body according to claim 1.

6. A light-transmitting window for a digital micro mirror device, where the light-transmitting window uses the spinel sintered body according to claim 1.

7. A light-transmitting lens for a light-emitting device, where the light-transmitting window uses the spinel sintered body according to claim 1.

* * * * *